April 8, 1930.   T. V. BUCKWALTER   1,753,772
ROLLER BEARING AXLE CONSTRUCTION
Filed Dec. 27, 1927
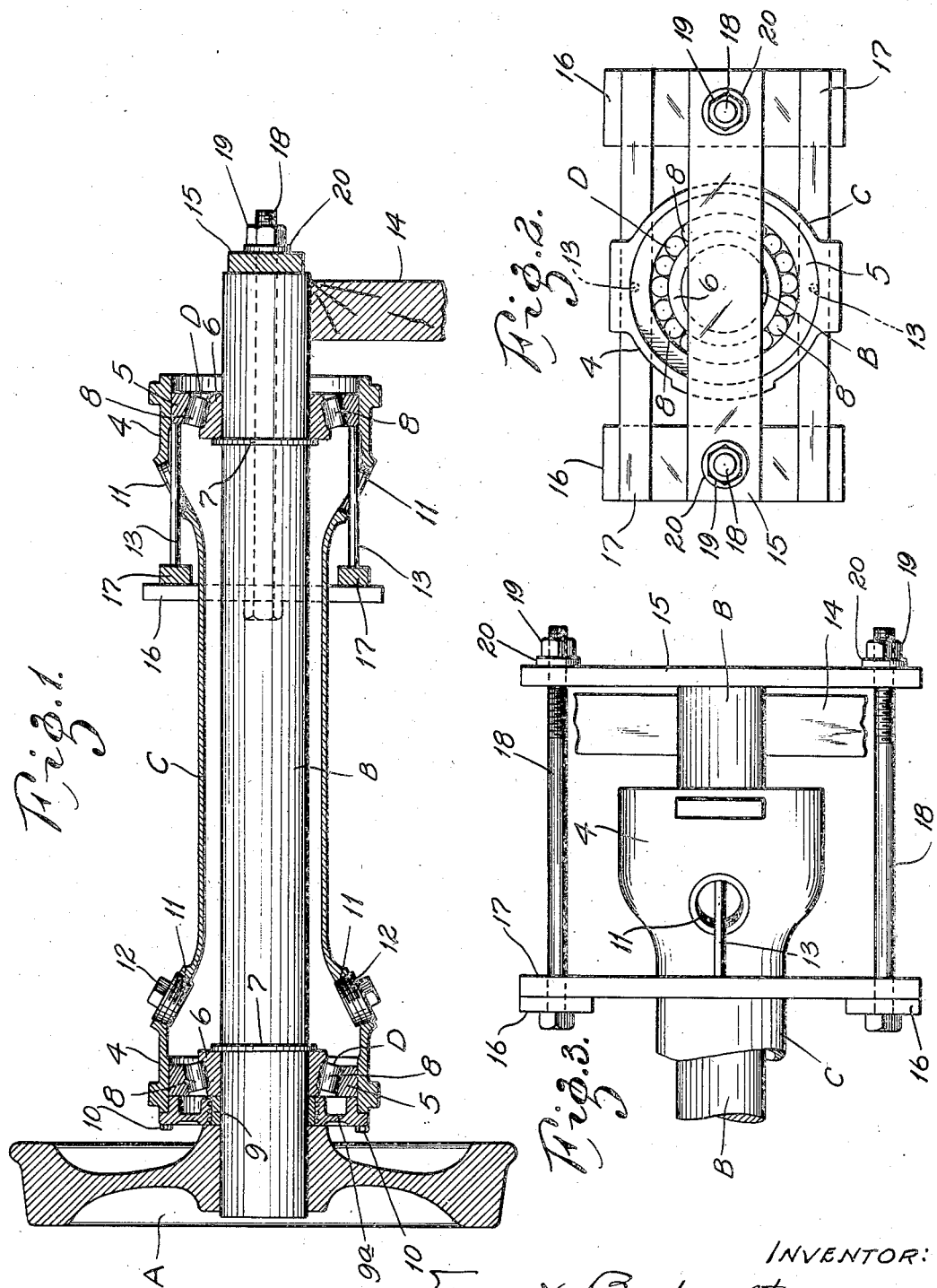
INVENTOR:
Tracy V. Buckwalter
by Court Court Gravely
HIS ATTORNEYS.

Patented Apr. 8, 1930

1,753,772

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

ROLLER-BEARING-AXLE CONSTRUCTION

Application filed December 27, 1927. Serial No. 242,930.

This invention relates to roller bearing railway car axles of the type wherein the roller bearings are interposed between the solid axle and the ends of the tubular housing that encases said solid axle. One of the principal objects is to permit inspection of the bearings and to permit insertion of a bearing removing device. The invention consists in the roller bearing axle construction hereinafter shown and described.

In the accompanying drawing, which forms part of this specification, and wherein like symbols refer to like parts wherever they occur—

Fig. 1 is a longitudinal sectional view of an axle construction, one-half of the axle being shown in running condition and the other half being shown with certain parts removed to accommodate a device for removing the cup of the bearing;

Fig. 2 is an end elevation of the axle construction and cup removing device; and Fig. 3 is a plan view of the parts shown in Fig. 2.

In the axle construction illustrated in the accompanying drawing, wheels A are fixedly secured to the ends of a solid axle B. Surrounding the solid axle B, between the wheels A on the ends thereof, is a tubular axle housing C whose diameter is greater than the diameter of said axle. The tubular axle housing C is flared outwardly adjacent to the ends thereof to form enlarged cylindrical end portions 4 adapted to receive tapered roller bearings D. As shown in the drawing, the roller bearings are interposed between the solid axle B and the enlarged end portions 4 of the axle housing, each of said bearings comprising an outer bearing member in the form of a cup 5, seated in the chamber formed in the enlarged end portion 4 of the said housing, an inner bearing member in the form of a cone 6 mounted on said axle with its inner end abutting against a collar 7 thereon, and tapered antifriction rollers 8 interposed between said cup and said cone. In practice, the cup 5 is pressed into the enlarged end 4 of the tubular axle housing, and the cone 6 has a press-fit on the axle and seats against a collar 7 thereon. A suitable collar or spacing member 9 is sleeved on the axle between the hub of the wheel A and the small end of the bearing cone; and the housing, which serves as a reservoir for lubricant, is closed at each end by means of an annular closure plate 9$^a$ which surrounds the collar 9 and is removably secured to the end of the axle housing by cap screws 10.

The flared end portion of the axle housing is provided adjacent to the inner end of the bearing with two or more relatively large openings 11 that are closed by threaded plugs 12. These openings serve as hand-holes, into which the hand may be inserted when it is desired to inspect the bearing. Said openings also serve as oil holes through which lubricant may be supplied to the axle housing; and they also permit tools in the form of pusher bars 13 to be inserted into said housing through said openings and engaged with the inner end of the bearing cup or cone of the bearing to force the cup out of the chamber in the housing or the cone off the end of the axle.

When it is desired to remove the bearing cup from the axle housing, the entire axle construction is preferably removed from the truck, the wheels and the closure plates are removed from said construction and the solid axle is supported at each end preferably by means of blocks 14. The plugs 12 are then removed from the openings in the axle housing and the pusher bars 13 are inserted through said openings with their ends in abutting relation to the inner end of the cup.

Pressure is then applied to the pusher bars to force the cup out of the housing by means of an apparatus comprising a horizontally disposed outer cross-bar 15 adapted to bear against the outer end of the solid axle; vertically disposed inner cross-bars 16 arranged one on each side of the axle housing and extending above and below the same back of the holes 11 in the flared end portion of said housing; horizontal inner cross-bars 17 located above and below said axle housing opposite the exposed ends of the pusher bars 13 and spanning the spaces between said vertically disposed inner cross-bars 16 with their ends overlapping the ends thereof; and horizontal bolts 18 extending longitudinally of said housing on opposite sides thereof and passing through alined holes provided therefor in the ends of the outer cross-bar 15 and in the lapped ends of the vertically and horizontally disposed cross-bars 16 and 17, respectively. As shown in the drawing, the bolts 18, which connect the inner cross-bars 16 and 17 to the outer cross-bar 15, are provided at their inner end with heads which bear against the inner faces of the vertical cross-bar 17 and are provided at their outer ends with nuts 19 adapted to bear against the outer face of said outer cross-bar 15. If desired, suitable thrust bearings 20 may be mounted on the bolts 18 between the outer cross-bar 15 and the nuts 19 to facilitate turning thereof.

With the bearing removing apparatus applied to the end of the axle construction in the manner shown and described, the bearing cup is removed from the enlarged chamber in the end of the axle housing by tightening the nuts 19 on the bolts 18, which operation causes said bolts to be drawn outwardly, which movement is transmitted through the inner cross-bars 16 and 17 to the pusher bars 13, which push against the inner edge of said cup and thus force the same out of said chamber.

Obviously, my invention is applicable to other types of roller bearing axle constructions and is not limited to the details of construction illustrated in the drawing which represents only one embodiment of the invention.

What I claim is:

1. In a roller bearing axle construction, an axle, a tubular housing enclosing said axle and having enlarged end portions forming an enlarged chamber at each end of said housing, and a roller bearing located in said chamber with its outer raceway member seated therein and with its inner raceway member mounted on said axle, the enlarged end portion of said housing having openings therethrough through which access may be had to said bearing.

2. In a roller bearing axle construction, an axle, a tubular housing enclosing said axle and having flared end portions terminating in enlarged chambers, means removably secured to the ends of said housing for closing said chambers, roller bearings located in said chambers with their outer raceway members mounted therein and with their inner raceway members mounted on said axle, the flared portions of said housing being provided adjacent to the inner ends of said bearings with openings through which access may be had to said bearings, and removable closures for said openings.

Signed at Canton, Ohio, this 19th day of Dec., 1927.

TRACY V. BUCKWALTER